Nov. 6, 1945. W. H. PUMPHREY 2,388,658
BOLT
Filed Jan. 1, 1944
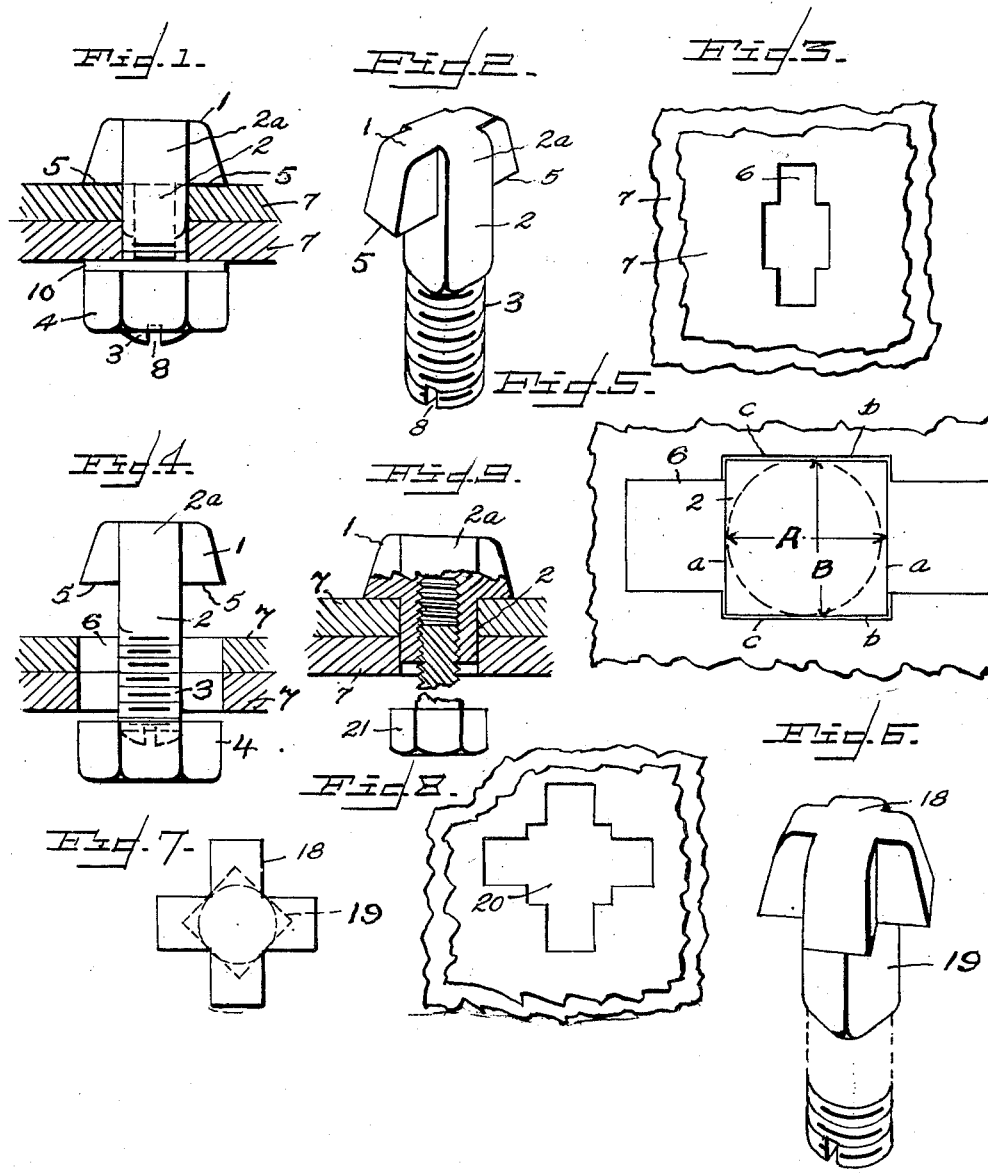
INVENTOR.

Patented Nov. 6, 1945

2,388,658

UNITED STATES PATENT OFFICE 2,388,658

BOLT

Walter H. Pumphrey, New York, N. Y., assignor of one-half to Eugene J. Cantin, New York, N. Y.

Application January 1, 1944, Serial No. 516,653

9 Claims. (Cl. 85—9)

The invention relates to an improved form of bolt designed specially for use in airplane construction but adaptable generally for separably or permanently securing structural members together that are accessible from one side only and cannot be reached from the opposite side owing to the lack of space and/or the presence of obstructions of various kinds.

Among the important features of the invention may be mentioned first, that the bolt is self-centering while being inserted in registering openings of plates or other members and continues thus effective until the bolt head is brought to a bearing and firmly seated and secured against the inner or inaccessible side of the inner plate or member. The advantage of this self-centering action is that it saves time and labor of workmen, who are relieved of the necessity of positioning the bolts in the plate openings and are only required to enter and push the bolts in and the centering is automatic.

The second feature is that the bolt, when seated, as above described, is not only positively prevented from turning, in order that a nut may be run on and screwed home, but, in addition, is frictionally held by a forced fit of the neck thereof in a shaped central portion of the inner plate opening, to withstand any accidental force tending to dislodge it. Thus positioned and held, the bolt is self-maintaining until driven out of the plate opening by a hammer or other tool.

The common practice, in securing two structural members together, is to line up or position the members, with the openings therein for the bolts registering and then insert the bolts through the registering openings of both plates and while that practice can be followed in the use of the present bolt, the above described second feature of the invention permits a radical departure to be made from it which is particularly advantageous where the outer plate or member is to be removably secured. For example, the forced fit of the neck of the bolts in the openings of the inner plate, enables bolts entered from the accessible side thereof to be securely held therein, as to permit the outer plate or member to be fitted over the projecting bolts and the nuts run on to draw the plates or members in close contact relation. The subsequent removal and replacement of the outer plate will merely be a matter of running the nuts off and on the bolts, which are securely anchored in the openings of the inner plate.

In the present embodiment of the invention, the bolt is relatively proportioned for insertion, head first, preferably by hand pressure, in specially formed registering openings of plates or other members, until the head and neck formation of the bolt clears the inner side of the inner plate. Such clearance can be determined by running a nut on the bolt to engage a few end threads and serve as a stop to limit insertion and prevent the bolt from being pushed entirely through the opening.

The bolt openings in the plates are shaped closely to the cross sectional form of the bolt head and neck and the close fit holds the bolt centered at all times.

The inserted bolt is turned through a partial revolution, ordinarily by the aid of a tool, to shift the head out of line with the plate opening and is then drawn forward again, by the aid of a tool, to bring the head to a bearing against the inner plate and cause the neck thereof to re-enter the plate opening in forced fit relation, under the pressure applied by the tool, where it is firmly and securely held against movement in any direction.

The shank of the bolt beyond the neck projects through the opening on the accessible side of the plates and is threaded to receive a nut which, when screwed home, draws the plates together, secures them in close contact relation and covers and seals the bolt opening in the outer plate.

When an outer plate or casing is to be removably secured, ordinary lock washers will serve to hold the nuts from working loose and enable them to be run off the bolts whenever and as often as may be required. In thus removing an outer plate or casing, the bolts remain projecting from the inner plate, securely held there by the forced fit of the bolt necks in the plate openings and thus maintained, are properly positioned to register with the outer plate or casing openings when it is replaced. In other words, the bolts are self-holding in the inner plate openings without the aid of the nuts and suffer no damage in being thus tightly fitted, that would incapacitate them for transfer to other plates, after being once used.

Where the bolts are used to permanently connect plates, casing members or the like, lock washers may be dispensed with and the end of the bolt that projects from the nut, upset or spread to lock the nut on the bolt against working loose or a locking key may be driven in a groove in the bolt to cut through and/or mutilate the threads of the nut and so lock it against turning and working loose.

The insertion, turning and drawing the bolts forward to effect a forced fit of the neck in the plate opening and seat the head against the inner side of the plate, is greatly simplified and facilitated by the use of a simple tool, which holds the bolt for insertion and turning, by being threaded on the extreme end thereof and draws it forward to effect a forced fit of the neck and seat the head, by opposing cam-like projections, which are caused to alternately engage the outer surface of the plate by up and down movement of the tool handle.

The preferred embodiment of the invention is illustrated in the accompanying drawing but I do not wish to be understood as intending to limit myself to either the form or details shown, as various changes may be made therein without departing from the spirit and scope of the invention, as outlined in the appended claims.

In the drawing—

Fig. 1 shows the bolt securing two structural members together, the bolt being shown in elevation and the structural members in section.

Fig. 2 is a view in perspective of the bolt.

Fig. 3 is a fragmentary plan view of the structural members, showing registering bolt openings therein of a form suitable for permitting insertion of the bolt from the outer or accessible side and passage of the head and neck through the same to the inaccessible side.

Fig. 4 is a view similar to Fig. 1, showing the bolt inserted in the registering openings, with the head and square neck thereof clearing the inner side of the inner structural member, the position required for giving the bolt and quarter turn to bring the head at right angles to the bolt opening.

Fig. 5 is a view similar to Fig. 3, on a somewhat larger scale, showing the preferred relative dimensions of the squared neck of the bolt and the squared central portion of the bolt opening in the plate or the like.

Fig. 6 is a view similar to Fig. 2, of a slightly modified form of the bolt.

Fig. 7 is a top plan view thereof.

Fig. 8 shows the plate opening required for the modified form of bolt illustrated in Figs. 6 and 7.

Fig. 9 is a vertical sectional view of a further modified form of the bolt.

Referring now to the drawing, the bolt consists of a flat, upright head 1, as viewed in Fig. 2, a squared neck 2, of greater thickness than the minor dimension of the head, which adjoins and merges into the head and a shank 3, threaded for a nut 4.

The head proper, in the preferred form, is rectangular in horizontal section, as best shown in Fig. 2, reinforced on its opposite flat sides by upward extensions 2ª, 2ª, of the squared neck. The major dimension of the head exceeds the thickness of the neck sufficiently to provide adequate bearing surfaces 5, 5, beyond the neck, at opposite sides of registering openings 6, in plates or other structural members 7, 7, in which the bolt is designed to be inserted for use. The minor dimension of the head is made less than the thickness of the neck, as above stated, for several reasons. The first and most important is to enable the square neck to be utilized for automatically centering and maintaining the bolt centered in the plate opening at all times, thus saving the time and labor of workmen in positioning the bolts when inserting them in the openings; furthermore, it is desirable, advantageous and frequently necessary, to have the nuts, when screwed home, close and seal the bolt openings in the outer plate and by reducing the bolt head, as above described, such openings for the passage of the head, can be made small enough to come within the coverage of the nuts and not exceed it and finally, reduction in the size of the plate openings avoids unnecessary weakening of the plates along the line of greatest strain, avoids unnecessary waste of metal in the punchings and effects material economy in power and size of the machines required to punch the plates.

The neck of the bolt is squared in cross section, that is to say, adjoining sides are at right angles to each other, and may be proportioned relative to the plate opening in which the bolt is designed to be used, for either drive or hand pressure insertion therein. Preferably, the bolt is inserted by hand pressure, head first, in the registering opening of the plates and pushed through until the head and squared neck thereof clear the inner or inaccessible side of the inner plate, as shown in Fig. 4. To enable this to be done, the thickness A of the neck (see Fig. 5) slightly exceeds the diameter of the shank of the bolt and the corresponding dimension of the squared central portion of the opening in the plates is made slightly greater to permit free passage of the sides a, a, of the neck therein. The thickness B of the neck is the same as the diameter of the shank of the bolt and the corresponding dimension of the plate openings is made slightly greater, for free passage of the sides b, b, of the neck therein, so that no resistance is encountered in inserting the bolt to position it as in Fig. 4.

In thus providing for the insertion of the bolt by hand pressure, the relative proportioning is such that when the bolt is turned 90 degrees, and drawn forward by the aid of a tool, to cause the neck to re-enter the squared portion of the plate opening, a tight fit is effected between the sides a, a, of the neck and the side c, c, of the plate opening, that holds the bolt firmly and securely against any accidental force tending to displace or dislodge it and its removal can be effected only by driving it out by the blows of a hammer or like tool. The neck is of such length as to extend through the opening of the inner plate and preferably enters the opening of the outer plate to a suitable depth, to hold the plates against lateral independent movement. The end of the neck adjoining the shank of the bolt, is made slightly tapering to facilitate entry and re-entry into the plate openings. For a drive insertion of the bolt, the square of the neck would be made equal to the diameter of the shank and the squared portion of the plate openings, a trifle smaller.

The shank of the bolt beyond the neck is threaded for a nut and its diameter is substantially equal to the thickness of the neck but may be made somewhat less, if preferred. The end of the shank is suitably shaped, as indicated at 8, to provide a tool hold for turning the bolt 90 degrees after it is inserted in the plate openings.

When the bolt is turned by a tool, as above described, a second tool is required to withdraw the bolt for re-entry of the neck in the plate opening and is positioned straddling the bolt, in the space shown in Fig. 4 between the outer plate and the nut.

After the bolt is drawn forward and the head brought to a bearing against the inner plate, the nut, on being screwed home, may be temporarily secured against working loose by a lock washer 10 or, if the connection is to be permanent, the end of the bolt projecting beyond the nut may be upset and spread in the usual well known manner or a slightly tapered locking key may be driven in a groove of the bolt, to cut through or mutilate the thread of the nut and so secure it against working loose. In addition to serving as a nut lock, the pin may be used as a stop gauge, by being positioned to prevent the nut from being run off the bolt when they are being assembled for insertion by hand pressure.

While the above described method of assembling, inserting, turning and drawing the bolt forward, may be followed on a job requiring only a few bolts, where the number runs into hundreds and perhaps thousands, an assisting tool will save considerable time and labor and enable the bolts to be rapidly secured in position.

The tool comprises a socketed member 13, tapped for engaging the threaded end of the bolts and is provided in the threaded socket with a threaded plug, which may be run in and out, to vary the effective or available depth of the socket and limit entrance to the extreme end of the bolt. In thus limiting the number of bolt threads that can be engaged by the socketed member, the length of the bolt projecting beyond the member can be so regulated that when the bolt, held by the tool, is inserted, the squared neck will just clear the inner side of the inner plate. As the bolt bottoms hard against the screw plug in the socket, it can be given a quarter turn by means of the tool, to bring the head at right angles to the plate opening. To now draw the bolt forward to bring the head to a bearing against the inner plate and cause the neck to re-enter the squared portion of the plate opening, a handle is pivoted to the socketed member and provided on either side of it with cam-like projections which bear against the outer plate. When the handle is given up and down motion about the pivot, the wedging action of the cam-like projections against the outer plate, draws the bolt forward as required and by giving the tool a left turn or two, it is readily disengaged from the bolt and the nut is run on and locked, as above described.

In the modification shown in Figs. 6, 7 and 8, the bolt head, in horizontal section, is in the form of a cross 18 and the squared neck 19, is disposed at 45 degrees to the lines of the cross, otherwise the bolt is similar to the form shown in Fig. 2. The plate opening 20, for the modified bolt, is of the form shown in Fig. 8 and when the bolt is inserted to clear the inner side of the plate, as previously described, it only need be turned an eighth of a revolution to bring the squared neck in line with the central squared portion of the opening for re-entry therein in forced fit relation.

In the modification shown in Fig. 9, a headed screw 21 is substituted for the threaded shank and nut and the squared neck of the bolt is bored and tapped to receive it.

As the many important advantages of the invention will be apparent from the foregoing description, it will not be necessary to further enlarge upon the same.

Having described my invention, I claim:

1. A bolt, insertable head-first in an opening of a structural member, accessible from one side only of the member, to secure the bolt in forced fit relation in the opening, consisting of a suitable head formation that extends beyond the neck of the bolt transversely of the axis thereof, the neck adjoining the head having a cross-sectional form suitable for providing a major dimension of certain thickness between two of its opposite sides and a minor dimension of less thickness at right angles to the major dimension between its other two sides, and a threaded shank formed as a continuation of the neck, the cross-sectional form of the bolt head and neck being such as to freely enter and pass through the opening in the member and upon being thereafter turned through a partial revolution, the bolt head, as thus repositioned, spans the opening in the member and the neck of the bolt is relatively aligned to re-enter the opening with its major dimension becoming forcibly jammed therein as the bolt is partially withdrawn by applied pressure to seat the head solidly against the inner side of said member.

2. A bolt, as defined in claim 1, in which the major and minor dimensions of the neck are provided by a comparatively slight variation in the cross-sectional form of the neck from a true square, the said major dimension being disposed in such relation to the head of the bolt as to pass freely, with the head, through the opening in the structural member and to thereafter become securely jammed in said opening against accidental displacement, after the inserted bolt is turned through a partial revolution, and as it is partially withdrawn, by applied pressure, to seat the bolt head solidly against the inner side of the member.

3. A bolt, as defined in claim 1, in which the combined cross-sectional form of the bolt head and neck are made to conform substantially to the shape of the opening in the structural member, to facilitate entry and free passage through the same of the headed end of the bolt.

4. A bolt, as defined in claim 1, in which the cross-sectional form of the bolt at any point in its length is such as to render the bolt self-centering in the opening in the structural member as the head and neck thereof are entered and passed through the same.

5. A bolt, as defined in claim 1, in which the diameter of the threaded shank of the bolt does not exceed the thickness of the minor dimension of the neck thereof.

6. A bolt, as defined in claim 1, in which the diameter of the threaded shank of the bolt is made equal to the minor dimension of the neck thereof to insure self-centering action of the bolt at all times in the opening of the structural member.

7. A bolt, as defined in claim 1, in which the head formation of the bolt is such as to extend transversely of the axis of the bolt beyond the neck and its thickness does not exceed the major dimension of the neck.

8. A bolt, as defined in claim 1, in which the head formation of the bolt is such as to extend transversely of the axis of the bolt beyond the neck and in parallel alignment with the major dimension of the neck.

9. A bolt, as defined in claim 1, in which the head formation of the bolt is such as to extend transversely of the axis of the bolt beyond the neck but is of less thickness than the neck and is reinforced on opposite sides by upward extensions of the neck.

WALTER H. PUMPHREY.